United States Patent
Svendsen et al.

(10) Patent No.: US 6,932,397 B2
(45) Date of Patent: Aug. 23, 2005

(54) FRONT ASSEMBLY FOR HEAVY GOODS VEHICLES

(75) Inventors: Benny Svendsen, Göteborg (SE); Jonas Odermalm, Askim (SE); Jörgen Håkansson-Bökmark, Lerum (SE)

(73) Assignee: Volvo Lastvagnar AB, Göteborg (SE)

( * ) Notice: Subject to any disclaimer, the term of this patent is extended or adjusted under 35 U.S.C. 154(b) by 0 days.

(21) Appl. No.: 10/605,068

(22) Filed: Sep. 5, 2003

(65) Prior Publication Data

US 2004/0104599 A1 Jun. 3, 2004

Related U.S. Application Data

(63) Continuation of application No. PCT/SE02/00410, filed on Mar. 7, 2002, now abandoned.

(30) Foreign Application Priority Data

Mar. 7, 2001 (SE) ................................................ 0100746

(51) Int. Cl.⁷ .............................................. B60R 19/00
(52) U.S. Cl. ...................... 293/117; 293/115; 293/120; 293/121; 293/122; 296/187.09
(58) Field of Search ................................ 293/115, 117, 293/120–122; 296/187.09, 193.1

(56) References Cited

U.S. PATENT DOCUMENTS

| | | | | |
|---|---|---|---|---|
| 1,411,254 A | * | 4/1922 | Braucci ....................... | 280/160 |
| 1,704,768 A | * | 3/1929 | Sigman ....................... | 293/120 |
| 3,869,164 A | * | 3/1975 | Schwenk ..................... | 293/134 |
| 4,264,093 A | * | 4/1981 | Long .......................... | 293/103 |
| 4,322,106 A | * | 3/1982 | Nespor ....................... | 293/121 |
| 4,387,920 A | * | 6/1983 | Slaughter et al. ........... | 362/505 |
| 4,541,661 A | * | 9/1985 | Hawk .......................... | 293/117 |
| 4,798,409 A | * | 1/1989 | Miller ......................... | 293/117 |
| 6,540,275 B1 | * | 4/2003 | Iwamoto et al. ............. | 293/24 |
| 6,726,260 B1 | * | 4/2004 | Wang et al. ................. | 293/119 |
| 6,758,515 B2 | * | 7/2004 | Ozawa et al. .......... | 296/187.09 |
| 2001/0026073 A1 | * | 10/2001 | Sato et al. .................. | 293/121 |
| 2004/0084236 A1 | * | 5/2004 | Okai et al. ................. | 180/68.4 |

FOREIGN PATENT DOCUMENTS

| | | |
|---|---|---|
| DE | 4323779 C1 | 6/1994 |
| DE | 19751451 A1 | 8/1998 |
| EP | 1072501 A2 | 1/2001 |
| JP | 2000280842 A | 10/2000 |
| SE | 504216 C2 | 12/1996 |

* cited by examiner

*Primary Examiner*—Stephen Gordon
(74) *Attorney, Agent, or Firm*—Novak Druce & Quigg, LLP (57) ABSTRACT

Method and arrangement for providing a front assembly of a heavy vehicle (1), which front assembly interacts with a front portion of a longitudinal frame (10) of a vehicle, and in which there is included an underrun protection that has a stiff, force-absorbing beam structure (5). The beam structure (5) is equipped with at least a first fastening member (18) which is arranged to interact with at least one second fastening member (20) arranged at the front frame part of the vehicle (1), with the first and the second fastening members being arranged, during assembly, to guide the beam structure (5) to a predetermined non-adjustable position on the frame essentially across the longitudinal direction of the frame (10). The beam structure is arranged to support at least some other components arranged at the vehicle front such as footsteps (6), headlight units (7) and panels (8) at predetermined non-adjustable positions, with the beam structure and the supported components together forming a front module (3).

6 Claims, 6 Drawing Sheets

FRONT ASSEMBLY FOR HEAVY GOODS VEHICLES

CROSS REFERENCE TO RELATED APPLICATIONS

This present application is a continuation-in-part patent application of International Application No. PCT/SE02/00410 filed 7 Mar. 2002, now abandoned, which was published in English pursuant to Article 21(2) of the Patent Cooperation Treaty, and which claims priority to Swedish Application No. 0100746-7 filed 7 Mar. 2001. Both applications are expressly incorporated herein by reference in their entireties.

BACKGROUND OF INVENTION

1. Technical Field

The present invention relates to a front assembly in a heavy goods vehicle, which front assembly interacts with a front portion of a longitudinal frame included in the vehicle and in which there is included a means for providing underrun protection, which means in turn comprises (includes, but is not limited to) a rigid force-absorbing beam structure. The invention also relates to a method for providing and/or assembling such a beam structure.

2. Background

Heavy goods vehicles, primarily cargo vehicles, have long been equipped with underrun protection for the purpose of preventing a smaller and lower vehicle from being partially pushed in under the heavy goods vehicle in the event of a collision. In the event of a front collision between a car and a cargo vehicle that does not have underrun protection, the passenger compartment and front part of the car generally end up under the cargo vehicle due to the large difference in height between the bumpers of the car and the heavy vehicle. Also, considerably higher collision forces are exerted on the passenger compartment of the car than is the case when the cargo vehicle is equipped with underrun protection. When so equipped, the underrun protection causes the energy to instead be primarily absorbed in the front portion of the car and in this way the collision force against the passenger compartment can be considerably reduced.

Front underrun protection, as the name implies, is typically arranged in the front of the vehicle immediately inside or behind a traditional bumper. The underrun protection is usually constituted by a separate, force-absorbing and rigid beam structure, which by means of supporting consoles, is arranged in the vehicle.

Conventionally, the underrun protection has been made energy-absorbing in various ways by construction-wise controlling the deformation of a beam structure, and its supporting consoles, in such a way that the deformation of the underrun protection, in the event of a collision, absorbs energy together with a deformation zone of the colliding smaller vehicle to reduce the collision force against the passenger compartment in the smaller vehicle.

A problem with previously known underrun protection systems and methods is, however, that they are relatively time consuming to assemble on the vehicle due to, for example, reasons of handling since the beam structure is relatively heavy and difficult to position when attaching it to the vehicle. Another problem with heavier vehicles is that more and more adjustment work and more adjustable consoles are necessary to satisfy the increasing demands for an aesthetically appealing front; that is to say, adjustments must be made so that spaces and play between the components will be kept within small tolerances, preferably on a level with the finish of a car. This problem becomes especially emphasized in those cases when large units with many components, also referred to as so-called modules, are produced within manufacturing units especially intended for this purpose, either separately, but internal to the vehicle producer, or externally at an outside producer, and then brought to the assembly line where they are assembled on the vehicle, and are then to fit together as a whole.

SUMMARY OF INVENTION

As at least one objective, the invention addresses the above mentioned drawbacks of known rununder assemblies and methods by providing a beam structure that is equipped with first fastening members that are arranged to interact with second fastening members that are arranged at the front frame part of the vehicle. The first and the second fastening organs are arranged, during assembly, to guide the beam structure to a predetermined non-adjustable position on the frame, suitably in a normal bumper position essentially across the longitudinal direction of the frame. Further, the beam structure is arranged to support at least some other components arranged at the front of the vehicle, such as foot-steps, headlight units and panels at predetermined, non-adjustable positions, with the beam structure and the components supported by forming it together as a front module.

In an advantageous embodiment of the invention, the front module also comprises bumper panels that at least partially cover the force absorbing beam structure.

In at least one embodiment, a front module is provided for a vehicle that has more than the normal ground clearance and that includes an extension beam structure attached to the underside of the beam structure, with the extension beam structure extending downwards.

In a preferred embodiment, the first fastening member or arrangement comprises an essentially horizontally oriented (relative to the second fastening member) protruding male part equipped with a handle and a head connected thereto. The cross-sectional area of the head exceeds the cross-section area of the handle, and the head exhibits a rear flange surface that faces the handle. In addition, the second fastening member comprises a female part that exhibits a first opening, the dimensions of which essentially correspond to the head of the male part, and a second opening, the dimension of which essentially correspond to the handle of the male part. The first opening communicates directly with the second opening, and a contact surface is defined around the second opening, which contact surface is arranged for contact against the rear flange surface of the head of the male part.

In an alternative embodiment, the second fastening member comprises an essentially horizontally oriented (relative to the first fastening member) protruding male part equipped with a handle and a head attached thereto. The cross-sectional area of the head exceeds the cross-sectional area of the handle, and the head exhibits a rear flange surface which faces the handle. In addition, the first fastening member comprises a female part which exhibits a first opening, the dimensions of which essentially correspond to the head of the male part, and a second opening the dimensions of which essentially correspond to the handle of a male part. The first opening communicates directly with the second opening, and a contact surface is defined around the second opening which is arranged for contact against the rear flange surface of the head of the male part.

Suitably, the first and second opening in the female part together form an essentially keyhole-shaped opening.

The male part is, in a preferred embodiment, essentially circularly cylindrically formed.

The invention also provides a method for assembling a vehicle front so that a carrier, preferably consisting of a beam structure intended as an underrun protection, is pre-assembled at fixed points with components included in the front such as headlight units, footsteps and bumper panels to form a front module. The front module is, with the aid of the first and second fastening member, fixed in a locked position essentially crosswise relative to the vehicle at the front portion of the vehicle frame.

In a preferred embodiment of the method version of the invention, the pre-assembled front module is assembled to the vehicle by a first fastening member belonging to the front module that is moved into engagement with a second fastening member fixed in the vehicle, and a locking function between the first and second fastening members is accomplished by means of a male part and a female part initially by tightening a screw or bolt connection.

Other characteristics and advantages of the invention will become evident from the following description of a preferred embodiment.

BRIEF DESCRIPTION OF DRAWINGS

The invention will be described in the following by means of an example of an embodiment with reference to the appended drawings in which.

DETAILED DESCRIPTION

Figure 1:
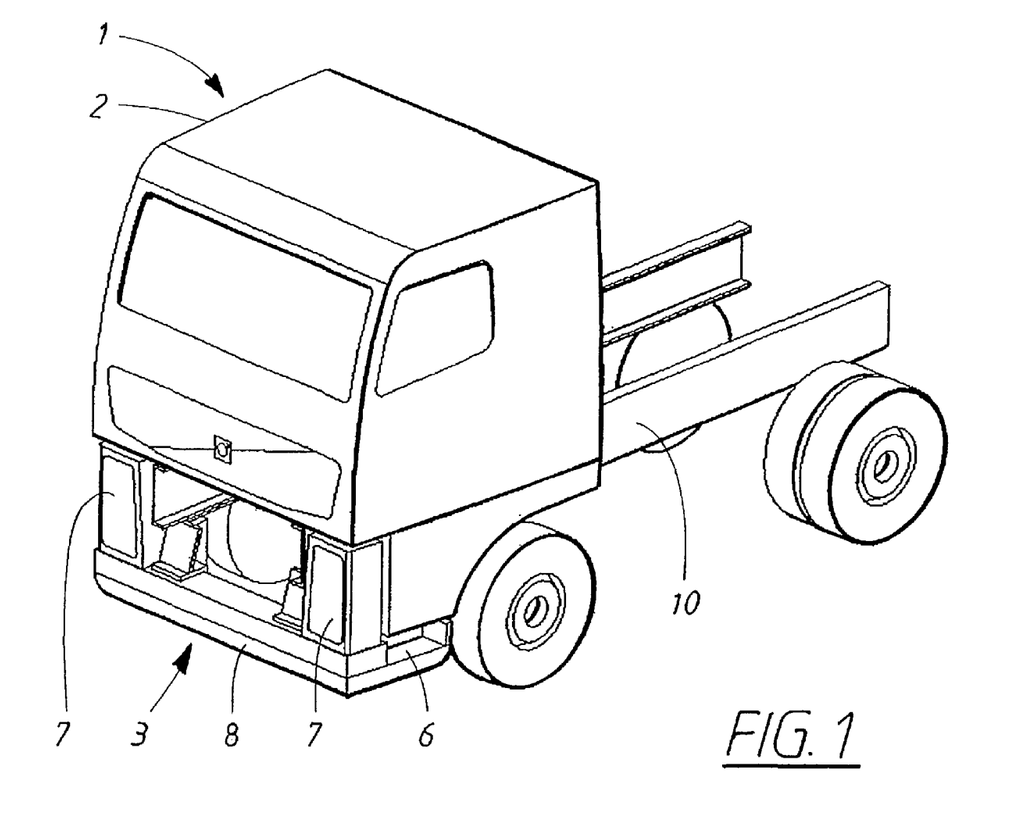
FIG. 1 schematically shows a heavy vehicle in the form of a towing vehicle for a trailer vehicle where the towing vehicle is equipped with a continuous lower front module comprising the front underrun protection.
Figure 2:
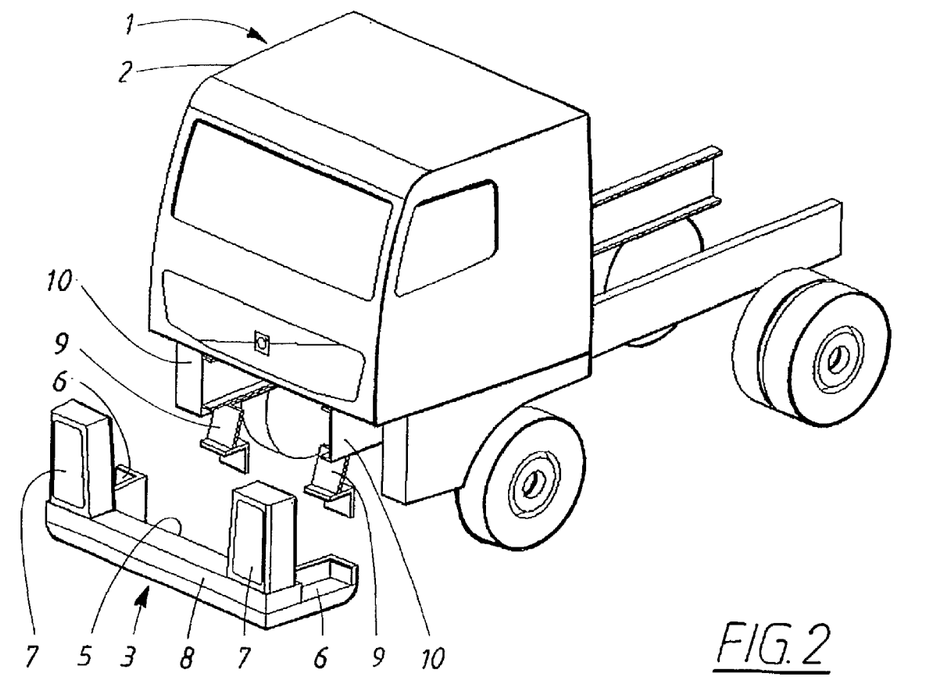
FIG. 2 shows the same towing vehicle as in FIG. 1, but in a position when the front module (shown just in front of the towing vehicle) is not arranged on the vehicle.

In FIGS. 1 and 2, reference numeral 1 refers generally to a heavy vehicle, which in the example shown, takes the form of a towing vehicle for a trailer. The vehicle 1 is in a traditional manner equipped with a cabin for the driver 2 and is furthermore, according to the invention, equipped with a continuous lower front module 3 comprising a forward underrun protection. The front module 3 in the embodiment shown comprises a number of components such as an integrated force-absorbing beam structure 5, two foot-steps 6, two headlight units 7 and a number of panels which form a bumper casing 8.

In FIG. 2, the front module 3 is shown separately in front of the driver's compartment 2 in a position when it has not yet been assembled on the vehicle 1. It will become apparent that the front module 3, according to the invention, is pre-assembled into one unit with, among other things, the purpose of facilitating the assembly of the details comprised in it of the vehicle 1 and in order to, as will be explained later, to give the comprised components, already from the beginning, an exact positioning relative to the rest of the vehicle front. The components of the module and their limiting edges and surfaces will thus, after being arranged on the vehicle, will have an acceptable fit as regards connections and space widths relative to other components comprised in the front of the vehicle for connection, preferably without any adjustment, and which of course which in turn must be assembled in carefully defined positions.

As will additionally be seen by FIG. 2, the front module 3 is arranged for fastening to two support consoles 9 which in turn, in a known manner, are fixedly attached to the frame 10 of the vehicle 1 in a carefully defined position relative to the frame (certain fastening details are not for the sake of clarity).

Figure 3:
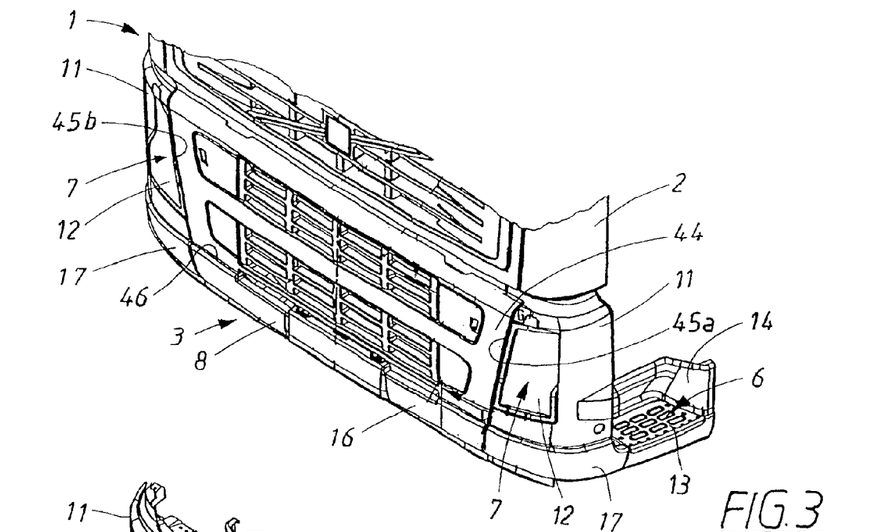
FIG. 3 shows a partial view of the front portion of the vehicle, in which the continuous lower front module is arranged on the vehicle.
Figure 4:
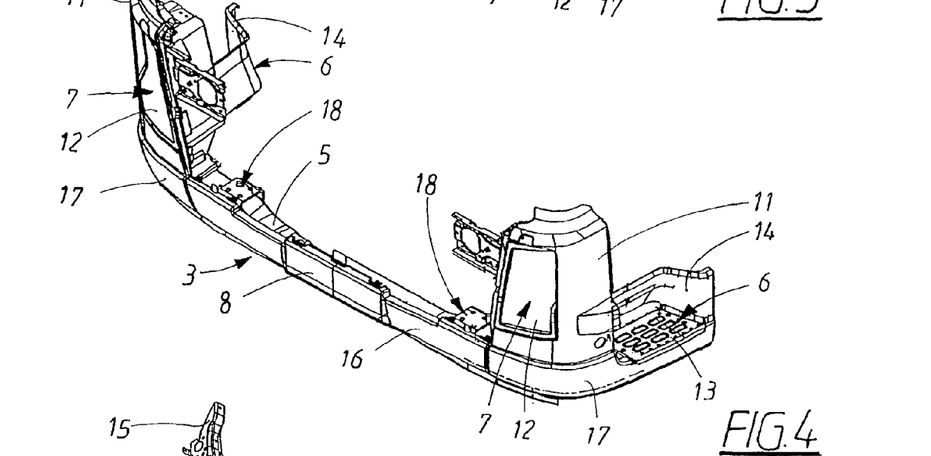
FIG. 4 shows the continuous lower front module unassembled.

FIG. 3 shows the front part of the vehicle 1 on a larger scale and with the front module 3 assembled on the vehicle 1. In FIG. 4, the front module 3 is shown in the same scale as in FIG. 3, and from these drawings it becomes evident that the parts that make up the front module 1 can include more front components. For example, the headlight unit 7 would include a headlight casing 11 with, among other things, a reflector inset (not shown) and lights (not shown), and a headlight lens glass 12. Furthermore, the foot-steps 6 each comprise a foot-step plate 13 and a foot-step wall 14. Between the headlight units 7 is a grill 44. Between the grill 44 and the headlight units 7, there is a space 45a and 45b. Under the grill 44, between it and the bumper casing 8, there is a space 46. It is important both aesthetically and for the practical function of the vehicle (avoidance of unnecessary wear and tear) that the widths of the spaces 45a, 45b and 46 be kept within given tolerances. By using the present invention, this is made considerably much easier.

Figure 5:
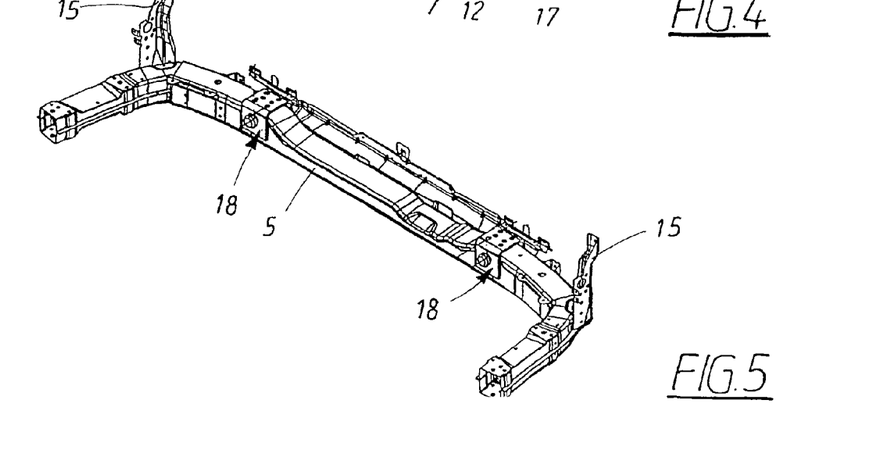
FIG. 5 shows the naked, force-absorbing beam structure in the front underrun protection.

FIG. 5 shows the force-absorbing beam structure 5 at an angle from behind. The beam structure 5 exemplarily consists of an essentially U-shaped steel beam with a rectangular cross-section, and in the example shown, is also equipped with assembly consoles 15 for fastening of the headlight units 7, but which are not assembled in FIG. 5.

The lower pre-assembled front module 3 thus comprises the headlight units 7, the beam structure 5, the foot-steps 6 and the bumper casing 8. The bumper casing has, as in cars, a more aesthetic than collision-protecting function, but the collision protecting function is here, present directly behind it in the shape of the beam structure. In the example shown, the bumper casing 8 is divided into three parts or panels that include a mid-section 16 and two side-sections 17. The bumper casing 8 is, in a preferred embodiment, made in a robust plastic material and covers the force absorbing beam structure 5 directly outside of it. The force absorbing beam structure 5, according to the invention, replaces a conventional bumper. In this case, the beam structure 5 thus serves as both a bumper and an underrun protection that in an advantageous manner reduces the weight of the vehicle. An important aspect of the invention is thus not to merely substitute the bumper for the underrun protection, but a primary difference between a conventional bumper and an underrun protection has here been used in a new way according to the invention.

Conventionally, a bumper is only intended to absorb shocks if the vehicle should bump into, for example, goods in a place of work. The traditional bumper assembly is thus not particularly rigid, with the consequence that when it is loose and unassembled it is neither form-enduring nor with exact tolerances. It can thus shift form when it is assembled to the front of the vehicle, and when the adjacent components are assembled, it can become necessary to make individual adjustment of every vehicle and the installed bumper in order to give the front of the vehicle a sufficiently accurate fit required of joints and spaces on modern designed trucks. An underrun protector or protection, however, incorporates a beam that is designed to absorb collision forces including much heavier loads than presented by the weight of the bumper. Underrun protections are thus very rigid and resultingly form-enduring which makes assembly possible with accurate tolerances. This quality has, according to the invention, been used so that when replacing the conventional bumper it is possible to eliminate the need for adjustment work and adjustment devices for components of the vehicle front that are positioned close to the bumper/underrun protection.

Since the fastening members are used to guide the underrun protection, which is manufactured with accurate tolerances to an accurately predetermined position in relation to the frame and around which the vehicle has been built, and in addition having fastening points with fixed and tolerance-accurate positioned fastening points and consoles for the other front components, examples of which have been given above, the comprising components do not need to be adjusted relative to each other afterwards, and which, during assembly, obtains a perfect position in direct aesthetic connection to the other parts of the front of the vehicle.

Regarding the series of exploded partial views described below, it will become apparent how the front module 3 is attached to the vehicle 1. For the sake of clarity, only one corner of the beam structure 5 is shown, as well as one of the two supporting consoles 9 that are fixed to the vehicle.

Figure 6:
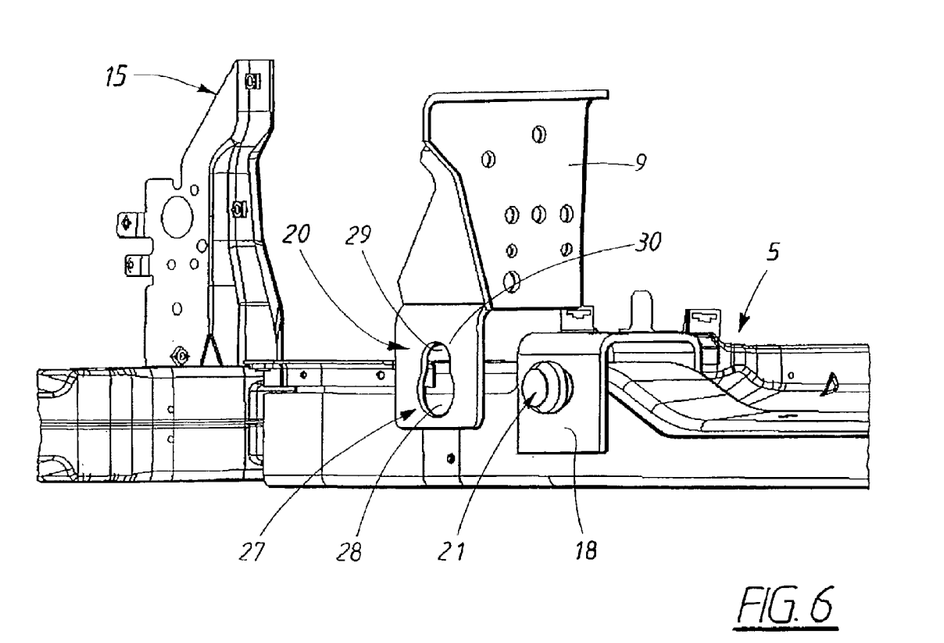
FIG. 6 shows a first partial view of the front construction with a couple of the fastening members, by means of which the front module has been attached to the vehicle and which depicts the male part of the first fastening member just before contact with the first opening of the female part in the second fastening member (which in the embodiment shown is fixed to one of the two supporting consoles fixed to the vehicle and which belong to the force absorbing beam structure)
Figure 9:
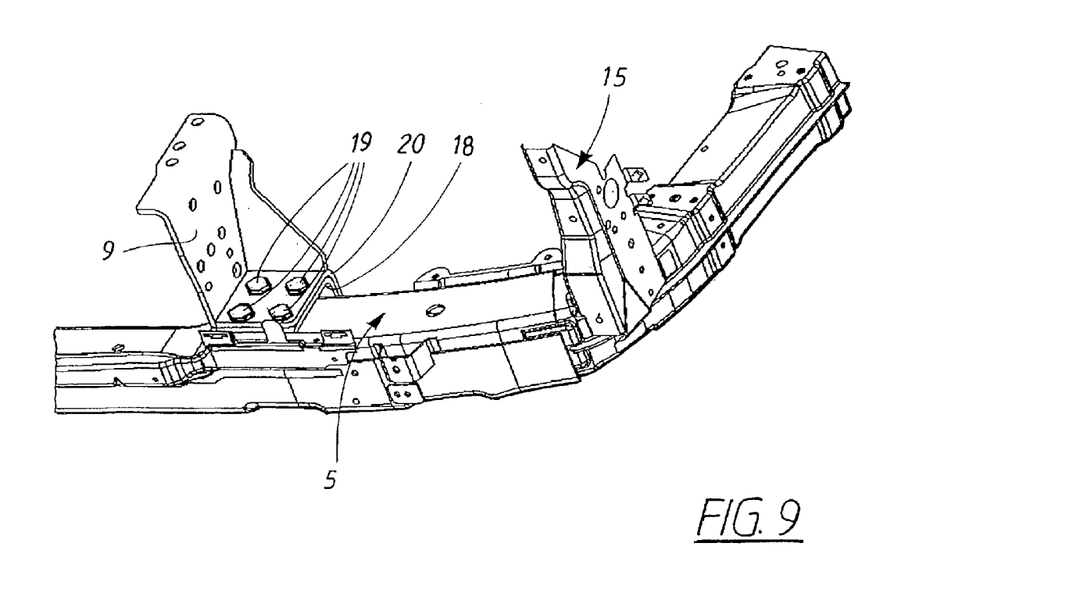
FIG. 9 shows a fourth partial view with the beam structure in the same position as in FIG. 8, but seen from the other direction from an angle above.

FIG. 6 shows a first partial view from which it will be evident that the front module 3, represented by the beam structure 5, exhibits a first fastening member 18 arranged to, after tightening of a screw connection 19 (as shown in FIG. 9), interact in a form-locking way with a second fastening member 20 fixed to the supporting console 9 of the vehicle 1. Alternatively, the screw connection 19 can be constituted by a bolt connection. As will become evident from FIGS. 4 and 5, the beam structure is equipped with two "first" fastening members at a distance from each other as defined above.

Figure 10:
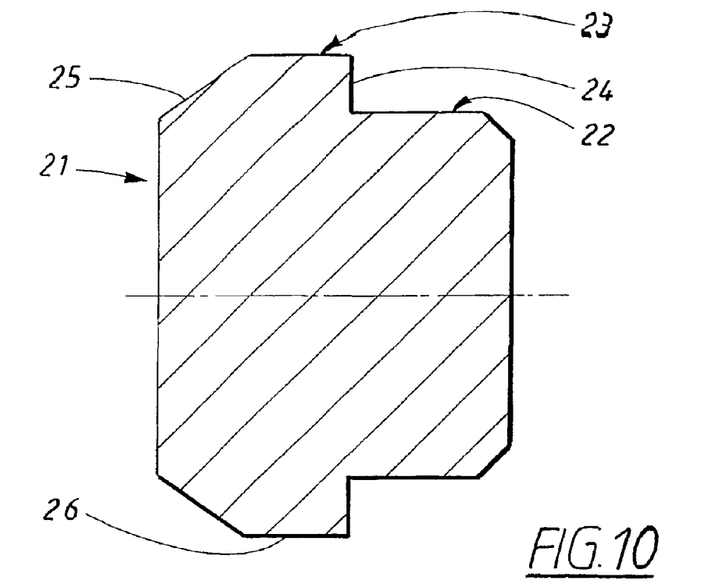
FIG. 10 shows an exploded, enlarged side-view of the male part of the first fastening member.

The first fastening member 18 comprises an essentially horizontal, relative to the second fastening member 20, protruding male portion 21 that is also shown separate in the exploded view of FIG. 10. The male part 21 is formed as a circular cylinder and exhibits a handle 22 and a head 23 connected to it. As will become evident from the figure, the cross-sectional area of the head 23 exceeds the cross-sectional area of the handle 22, with the head 23 at the transition to the handle 22 exhibiting a rear flange surface 24 that faces the handle 22. The head 23 further exhibits a conical guiding surface 25 and a cylindrical mid-portion 26.

The second fastening member 20 constitutes an integrated part of the supporting console 9, and comprises an essentially keyhole shaped female part 27. The female part 27 exhibits a first essentially circular opening 28, the dimensions of which essentially correspond to the head 23 of the male part 21. Furthermore, the female part 27 exhibits a second essentially circular opening 29, the dimensions of which essential correspond to the handle 22 of the male part 21. The first opening 28 communicates directly with the second opening 29 so that the above-mentioned keyhole shape is formed. A contact surface 30 is defined around the second opening 29. The contact surface 30 is arranged for contact against the rear flange surface 24 of the head 23 of the male part 21, with the purpose of achieving a form locking securement between the two fastening members 18 and 20. Also, the inner dimensions of the second opening 29 are tolerance-adjusted to the outer dimensions of the handle 22 of the male part so that an essentially perfect fit, or at least mating fit is provided for the handle in the opening 29.

Figure 7:
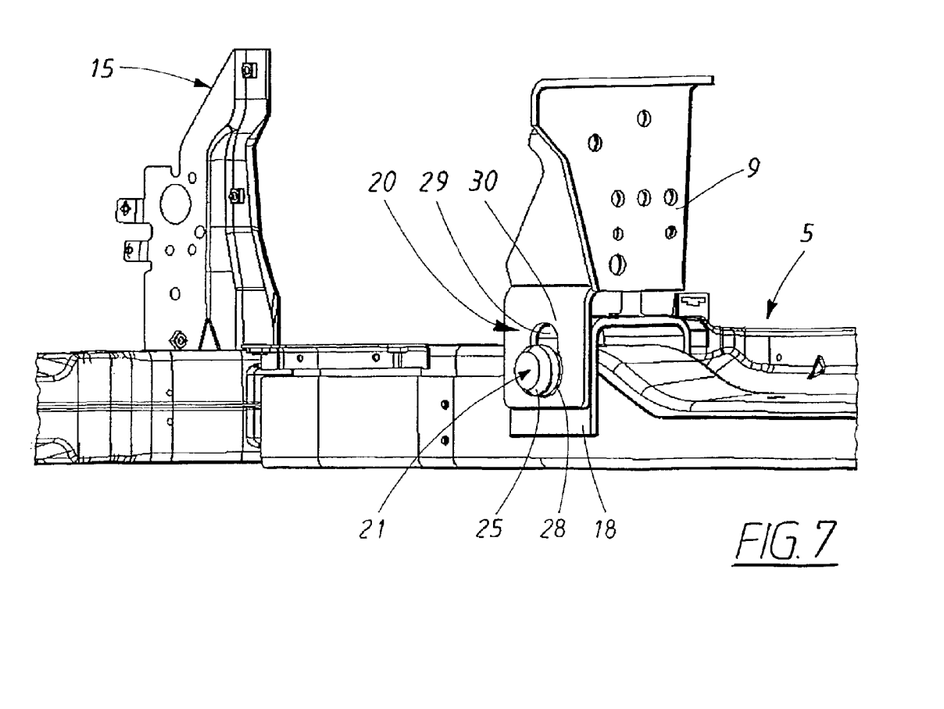
FIG. 7 shows a second partial view of the fastening members in which the male part of the first fastening member has just been brought through the first opening of the female part in the second fastening member, and assembly screws have been brought into contact with the two fastening members, but which have not been tightened.

The assembly of the front module 3 to the vehicle 1 is exemplarily carried out as follows. FIG. 6 shows the male part 21 of the first fastening member 18 just before contact with the first opening 28 of the female part 27 in the second fastening member 20. After this, the male part 21 of the first fastening member 18 is moved through the first opening 28 of the female part 27 in the second fastening member 20. The conical guiding surface 25 of the male part 23, as can be seen from FIG. 10, facilitates the guided movement of the male part. In FIG. 7, there is shown an intermediate position of the assembly process, where the male part 21 has been moved through the first opening 28 of the female part 27. In this position, the beam structure 5 can temporarily be released (let go of), and is retained in its position since the handle 22 of the male part 21 rests against the lower edge of the first opening 28. At the same time, assembly screws 19 as is depicted in FIG. 9, are brought into contact with screw holes made in the respective fastening members 18 and 20.

When the assembly screws 19 are tightened, the fastenings members 18 and 20 are brought flush together, while the handle 22 of the male part 21 is forced upwards and into the second opening 29 of the female part 27. In so doing, the rear flange surface 24 of the head 23 in the male part 21 is brought into contact with the above-mentioned contact surface 30 around the second opening 29, and at the same time there is guidance of the handle 22 in the male part 21 into the center of the second opening 29, as result of which a form locking is obtained both in the axial and radial directions of the male part 21. This form-locks the front module 3 to the supporting console 9 of the vehicle 1. The form-locking is thus obtained in an efficient manner during the tightening of the screws. The assembled position is shown in FIG. 8.

Figure 8:
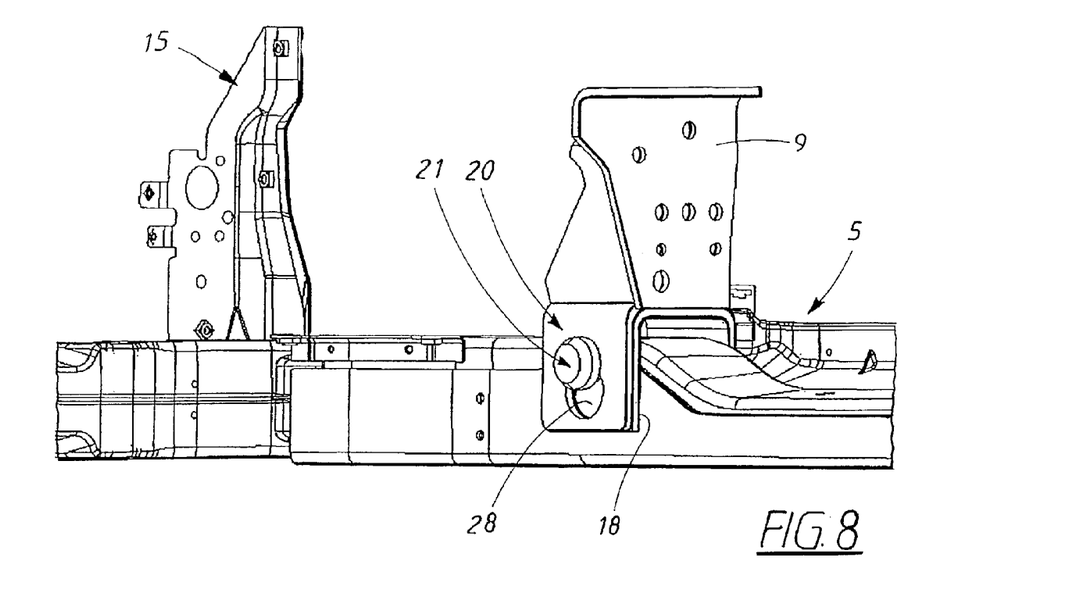
FIG. 8 shows a third partial view of the fastening members, where the assembly screws have been tightened with the consequence, according to the invention, that the handle of the male part has been forced into the second opening of the female part with the head of the male part now constituting form locking for all of the continuous front module.

In FIG. 9 the inventive design is shown in the same position as in FIG. 8, but seen from the other direction best characterized as a front angle, and from above. In this view, it can be seen how the tightened heads of the bolts 19 rest on top of the fastening member 20.

In an alternative, but not illustrated embodiment of the invention, the male part 21 can, in a reverse manner, be placed on the second fastening member 20; that is, on the supporting console 9 which is fixed to the vehicle, and the female part 27 is thus arranged on the first fastening member 18. The rest of the assembly according to this alternative embodiment can be carried out analogously to the above-described embodiment.

A basic principle behind the invention is that the beam structure 5, together with the footstep 6, the headlight units 7 and the bumper casing 8 are pre-assembled in fixed non-adjustable positions to a continuous lower front module 3. This front module is then subsequently assembled onto the vehicle 1 and then, with the aid of the fastening members 18 and 20, obtains an accurately predetermined position relative to the frame, and in turn, relative to the entire vehicle including the cabin and front panels. The other panels which have not been pre-assembled on the front module can also be guided to pre-determined positions with guidance from fixing points arranged on, or at the side of the front module.

Figure 11:
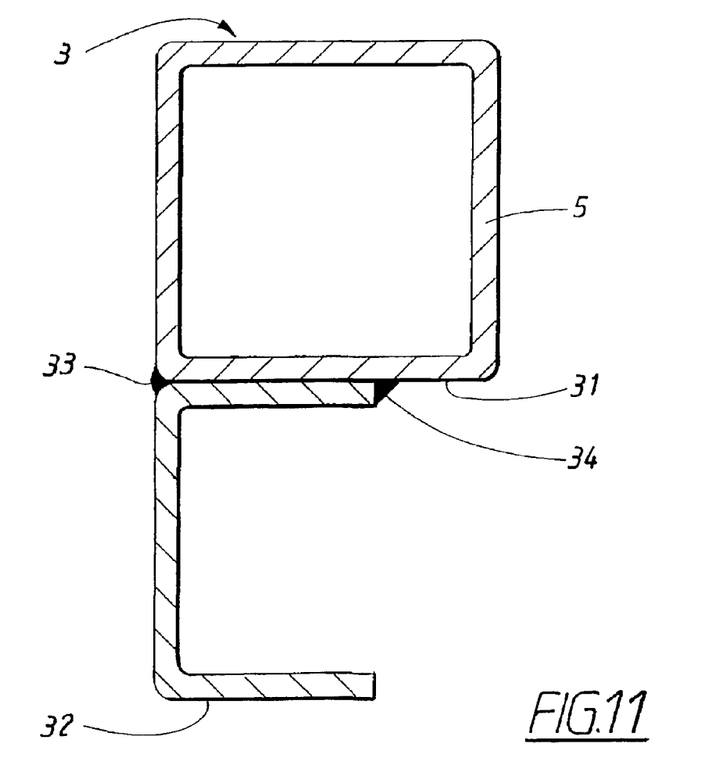
FIG. 11 shows a cross-sectional view of the force absorbing beam structure provided with an extension beam structure that extends downwards, and is intended for vehicles with larger than average ground clearance of a vehicle of the illustrated type.

In FIG. 11 an alternative embodiment of the invention is shown with the front module 3 here schematically represented by the beam structure 5 alone also comprising an extension beam structure 32 attached to the underside 31 of the beam structure 5 and extending downwards. The extension beam structure 32 is, according to the invention, assembled only on vehicles with larger ground clearance than the standard ground clearance of the vehicle type. An example of such a case is a so-called construction vehicle, which is designed with a larger ground clearance for use in more difficult terrain than is the case with comparable trucks designed for highway use in the same vehicle series. In the figure, the extension beam structure 32 consists of a steel profile that is welded to the underside 31 of the beam structure 5 by means of welding spots 33 and 34, respectively. Other attachment methods are of course also possible, for example screw connections or bolt connections.

It should be appreciated that the invention is not limited to the above described and illustrated embodiments, but can freely be varied within the scope of the appended claims. For example, the male part can have a different shape other than cylindrical; the only requirement being that the female part have a corresponding guiding shape. It is also possible to use only one pair of male and female parts, or more than two pairs. At least one pair of position defining members are, however, preferred according to the invention.

What is claimed is:

1. A front assembly for a heavy vehicle (1), comprising:
   a stiff, force-absorbing beam structure having at least a first fastening member comprising a male part including a handle and a head having a cross-sectional area exceeding the cross-sectional area of the handle, the head further including a rear flange surface facing the handle;
   a longitudinal frame having a longitudinal axis and a forward portion including at least a second fastening member arranged to receive the male part protruding therein to guide the beam structure to a predetermined position essentially perpendicular to the longitudinal axis, the second fastening member having a female part including a first opening, the dimensions of which essentially correspond to the cross-sectional area of the head, the female part further including a second opening formed in the second fastening member as a slot communicating with the first opening and having a contact surface and a slot width sized to receive the handle of the male part for contact of the rear flange surface against the contact surface of the second fastening member; and
   a front module supported by the beam structure, the front module comprising a plurality of components selected from the group consisting of footsteps, headlight units and panels, said plurality of components being accurately placed in prescribed positions based on predetermined positions therefore.

2. The front assembly as recited in claim 1, wherein the panels comprise a bumper casing that at least partially covers the beam structure.

3. The front assembly as recited in claim 1, wherein the first and second openings in the female part together form an essentially keyhole shaped opening.

4. The front assembly as recited in claim 1, wherein the male part has an essentially circular cylindrical shape.

5. The front assembly as recited in claim 1, wherein the front module further comprises an extension beam structure attached to the underside of the beam structure extending downwards therefrom.

6. The front assembly as recited in claim 1, wherein the at least a first fastening member comprises a second male part including a second handle and a second head having a cross-sectional area exceeding the cross sectional-area of the second handle, the second head further including a second rear flange surface facing the second handle, the second male part protruding essentially horizontally into the at least a second fastening member, that has a second female part including a first opening the dimensions of which essentially correspond to the cross-sectional area of the second head, the second female part further including a second opening formed in the at least a second fastening member as a slot communicating with the first opening of the second female part and having a second contact surface and a slot width sized to receive the second handle of the second male part for contact of the second rear flange surface against the second contact surface of the at least a second fastening member.

* * * * *